No. 711,924. Patented Oct. 21, 1902.
C. F. GLOYSTEIN.
METHOD OF OBTAINING TOBACCO EXTRACT AND NICOTIN.
(Application filed June 17, 1902.)
(No Model.) 2 Sheets—Sheet 2.
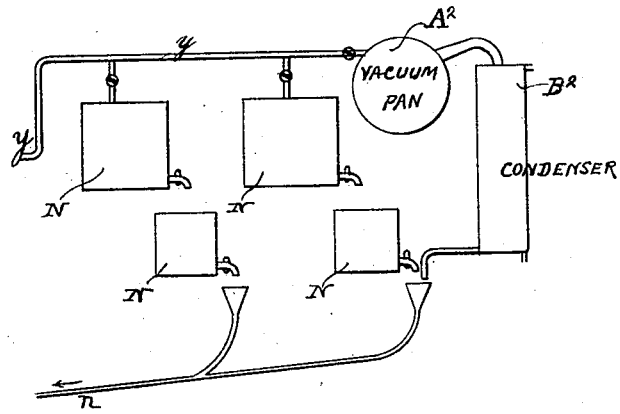
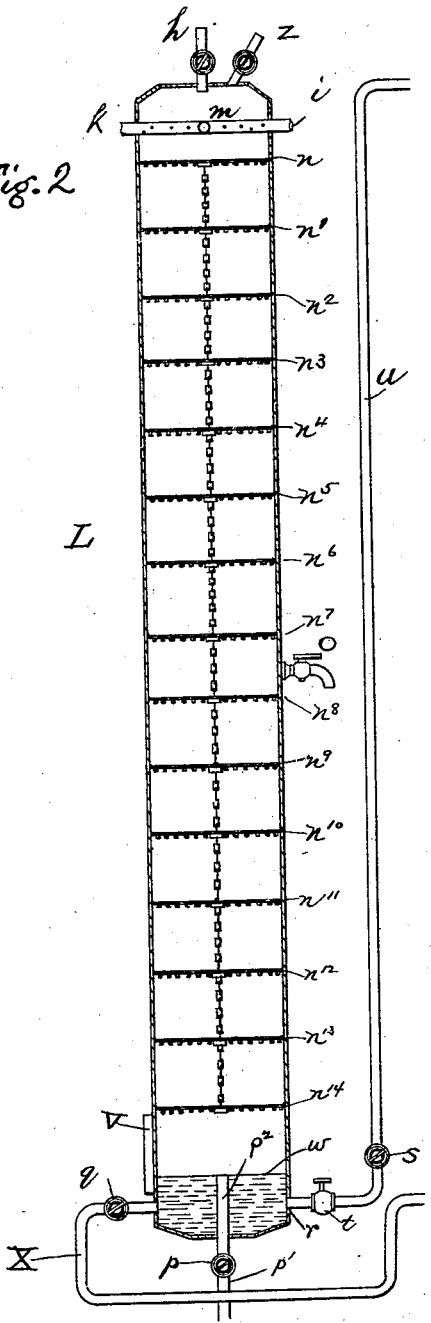
WITNESSES:
INVENTOR
CHRISTIAN FRIEDRICH GLOYSTEIN
BY
HIS ATTORNEYS.

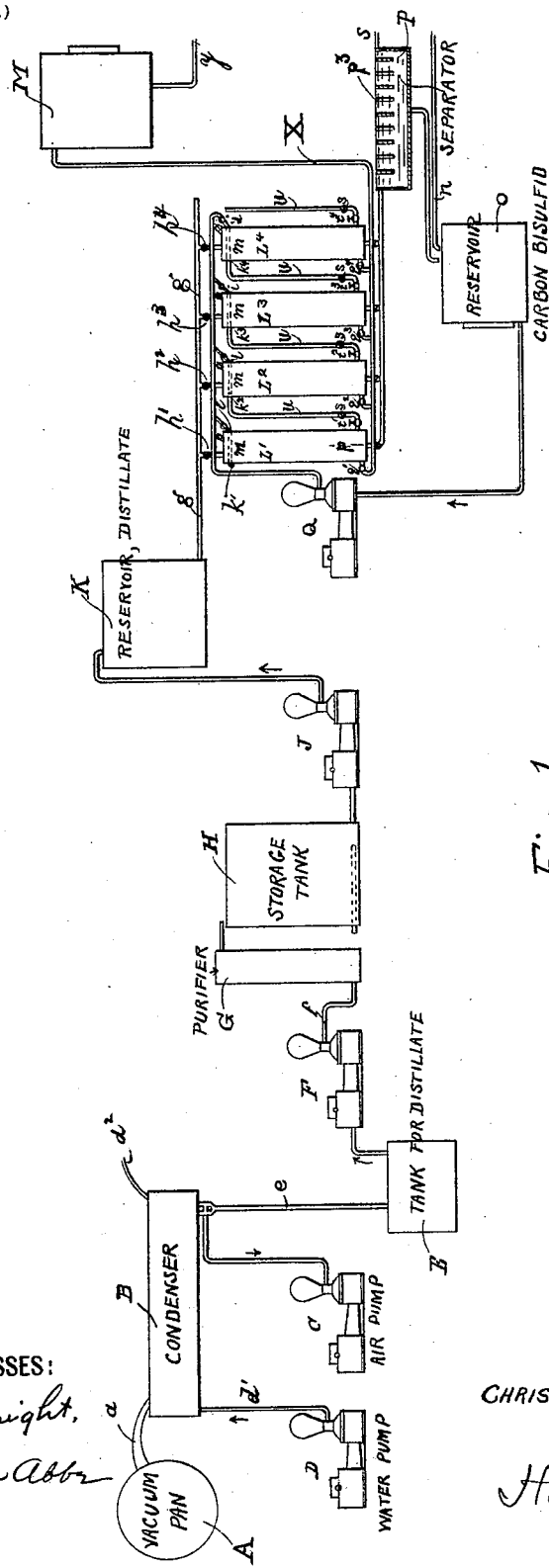

UNITED STATES PATENT OFFICE.

CHRISTIAN FRIEDRICH GLOYSTEIN, OF HENDERSON, KENTUCKY.

METHOD OF OBTAINING TOBACCO EXTRACT AND NICOTIN.

SPECIFICATION forming part of Letters Patent No. 711,924, dated October 21, 1902.

Application filed June 17, 1902. Serial No. 112,076. (No specimens.)

*To all whom it may concern:*

Be it known that I, CHRISTIAN FRIEDRICH GLOYSTEIN, a subject of the German Emperor, residing at Henderson, in the county of Henderson, State of Kentucky, have invented new and useful Improvements in Manufacturing Concentrated Tobacco Extract and Nicotin, of which the following is a specification.

This invention consists of an improved method of treating raw aqueous tobacco extract, whereby I am enabled to obtain on the one hand a concentrated tobacco extract containing all extractive ingredients suitable for flavoring or other purposes and as much nicotin as desired, and on the other hand a high-grade concentrated solution of nicotin with very little or no tarry substances and freed from ammonia, pyridin, and allied bases.

The method consists in first liberating the nicotin in the aqueous solution—as by adding an adequate quantity of alkali to the extract, evaporating the aqueous extract in a vacuum-pan to the desired consistency, and thereby carrying over the liberated nicotin in the vapors while leaving the extract in a concentrated condition in the pan, condensing the vapors, and then extracting the alkaloid from the thus-obtained distilled solution by a suitable extracting agent, such as carbon bisulfid, by passing the extracting agent in the form of small drops or streams through a body of the distillate held in a high and narrow tank. Finally, the nicotin is separated from the carbon bisulfid in any suitable manner. The bisulfid may be washed with a solution of acid to extract the salt of nicotin or alkaloid from the carbon bisulfid, or the carbon bisulfid now containing the alkaloid may be afterward evaporated, (boiling at 46° Celsius,) and thus the nearly-pure alkaloid is obtained. The carbon bisulfid is easily condensed and used again. The quantity of nicotin drawn from the raw aqueous extract can be regulated by the quantity of alkali added.

In the further description of the method I refer to carbon bisulfid as the extracting agent as an example; but I wish it to be understood distinctly that other extracting agents may be employed.

In the accompanying drawings, Figure 1 and Fig. 1ᵃ together constitute a diagrammatic representation of the apparatus for carrying out the process; and Fig. 2 is an enlarged sectional view of a part.

The vacuum-pan A, heated by steam, is filled with raw aqueous tobacco extract and an adequate quantity of a solution of an alkali to free the nicotin, or the alkali may be added to the raw extract beforehand in a separate vessel. When the evaporation commences, the vapor of the extract passes through the pipe $a$ into the surface condenser B. The pump D provides a constant supply of cold water through the pipe $d'$ into the condenser, which it leaves by pipe $d^2$. The air-pump C (dry system) sucks the air out of the condenser and may discharge it under the furnace. The condensed vapors of the extract containing the alkaloid, mixed with ammonia and some parts of carbonic and other volatile acids, leave the surface condenser by pipe $e$ and drain into the tank E, which may be situated about thirty-five feet below the condenser. The condensation in the surface condenser should be as perfect as possible to guarantee a perfect result. The distillate is forced by the pump F through pipe $f$ into the tank G, entering at the bottom. This is a high and narrow tank, filled with water and an alkali. The distillate enters constantly at the bottom of the tank G and passes up through its whole length to the top, mixing thoroughly with the alkali and leaving the tank at the top. The distillate is thus freed thoroughly from all acids and thence passes into the tank H. This storage-tank H is provided with perforated heating-pipes to regulate the temperature of the distillate. At this stage of the process the temperature of the distillate has to be controlled constantly to prevent a falling much below or a rising much above 36° Celsius, for the obvious reason that at 46° Celsius carbon bisulfid commences to boil, while at a lower temperature its extracting capacity diminishes very fast, and the good result of the process depends largely upon an even temperature of about 38° Celsius of the distillate containing the alkaloid and the carbon bisulfid. A pump J forces the distillate from the tank H to the open tank K, which is connected by pipe $g\ g$ with a number of closed iron cells $L'\ L^2\ L^3\ L^4$. The cells, the number of which is not limited, (I have found that four of them is most convenient,) are all alike and arranged on the principle of diffusion-cells. The height of each cell is preferably nine or ten times as great as its diameter; but a smaller height may do just as well. The construction of the cells is shown more fully in Fig. 2. From tank K extends a pipe-line $g$ to the top of each cell, which can be cut off by a valve $h'$ $h^2$ $h^3$, &c. On the top of each cell is an air-cock $z$, Fig. 2. On two opposite sides of the top of each cell are inlets $k$ and $i$, which are connected with each other inside of the cell by a pipe $m$. This pipe is all perforated, and directly under said perforated pipe $m$ is fixed a perforated steel plate $n$. From the center of this plate is hung a chain, on which at equal intervals about a dozen perforated plates $n$ $n'$, &c., are fastened. A small cock $o$ is provided, to take samples for analysis. The bottom of each cell has three valved outlets $q'$, $p$, and $r$. The outlet $p'$ has a nipple $p^2$, extending up into the cell about six inches, as indicated in Fig. 2. A pipe $u$, with a check-valve $s$ and a globe-valve $t'$, connects the lowest part of one cell with the uppermost part of the next neighbor at $k$ $k'$, &c., so that all the cells form one circuit, there being a free circuit from the upper part of each cell down to the bottom of it and thence through a pipe up again to the uppermost part of the next cell, down again to the bottom of this cell and up again through a pipe to the uppermost part of the next cell, and so on, when the valves in pipes $u$ are open. The connection of the pipe $u$ with the bottom of each cell is at a point below the top of the overflow-nipple $p^2$, Fig. 2.

All valves, fittings, pumps, &c., ought to be made entirely of iron, all brass being avoided, as brass is quickly injured by carbon bisulfid and alkalies. Water-gages V are provided to watch the level of the contents of the lower part of the cells.

M is a separator to separate distillate from carbon bisulfid which may have been drawn over from the cells. The mixture enters at the top, where the aqueous solution accumulates, and the carbon bisulfid is drawn off from the bottom.

N represents vessels suitable for the use of storing sulfuric acid or other acids. They are placed so that the contents of the upper ones may flow into the lower ones.

$A^2$ is an evaporating-pan, and $B^2$ is a surface condenser.

O is a reservoir for carbon bisulfid for storing purposes.

P is a long tank with an inlet near the top at one end and an outlet near the top at the opposite end. The upper three-quarter parts of the tank have numerous partitions $p^3$, with openings at the top alternating on the right side and on the left side, so that the fluid must follow a zigzag course. The partitions are open below. The carbon bisulfid carried in the fluid on its way through the tank settles to the bottom, wherefrom it is from time to time drained off into storage-tank O.

To continue the process, I pump into each cell by pump Q so much carbon bisulfid that the cell is filled up to the upper edge of the nipple $p^2$ at the bottom $w$, Fig. 2. When tank K is filled with the distillate containing the alkaloids, open the valves $h'$ $h^2$ $h^3$ $h^4$ and the air-cocks $z$ and allow all cells to be filled from tank K. Then close the valves $h'$ $h^2$ $h^3$ $h^4$ and air-cocks $z$.

To guarantee a good working of the cells, care should be taken that the cells are always well filled to their utmost capacity. Now pump carbon bisulfid by pump Q from reservoir O into cell L'. The carbon bisulfid will when entering the perforated pipe $m$ drop in small drops on plate $n$ and to plate $n'$ and then to plate $n^2$, &c., until it arrives in very small drops at $w$ and joins the carbon bisulfid standing already at the bottom of the cell. As the cell is already filled to its utmost capacity, just as much carbon bisulfid as entered the cell at $i$ will move into pipe $u$ until it is filled with it. Then the carbon bisulfid will run over into cell $L^2$, dropping again from plate to plate, joining the carbon bisulfid at the bottom of cell $L^2$ and again moving in pipe $u$ to pass subsequently into cell $L^3$, &c. By continuing pumping little by little the carbon bisulfid will pass through all the cells and arrive finally at the bottom of last cell $L^4$. From here it is led by pipe X to its further treatment. By this method of causing the carbon bisulfid to pass through the body of distillate in finely-divided drops or streams I am enabled to get a thorough extraction of the nicotin by simple and economical means. When sufficient carbon bisulfid has passed through the cells, close all the valves, with the exception of air-cocks $z$ and bottom valve $p$ of cell L', and allow the solution in cell L' to run through separator P into the sewage, or if it is desired to catch the ammonia contained in the solution pump it into an ammonia-still, in which case there is a second chance to catch small parts of carbon bisulfid which may have passed through separator P. On its way through the cells the carbon bisulfid comes into contact with every particle of the distillate, and the alkaloid is completely absorbed by the carbon bisulfid. Nicotin and other alkaloids are not only soluble in carbon bisulfid, but the carbon bisulfid extracts it from aqueous solutions.

The capacity of carbon bisulfid to absorb nicotin depends upon the temperature under which it acts. The contents of alkaloid in the aqueous solution and the temperature kept in the cells govern the quantity of carbon bisulfid to be pumped through the cells.

The cells just described work on the principle of the difference of specific weight between the aqueous solution and the carbon bisulfid. I close the bottom part of the cells with an accumulation of carbon bisulfid before they are filled with distillate containing the alkaloid and which is kept there by the nipple or any other arrangement which keeps a constant accumulation of carbon bisulfid at the bottom of the cells so high as not to allow any aqueous solution to enter pipe $u$ at any moment of the process and that the carbon bisulfid is kept constantly by check-valve S in pipe $u$ up to the top of it.

When the aqueous solution has been run off the cell L', I fill it again from the tank K, close all valves with the exception of valves $i^2$, $t^2$, $t^3$, $t^4$, and bottom valve $q'$, and I pump carbon bisulfid through valve $i^2$ into cell $L^2$ and thence through cells $L^3$ and $L^4$ and draw off from valve $q'$. Thus alternately all cells are renewed and brought under the extracting influence of carbon bisulfid.

When leaving the cells, only alkaloids and small parts of greasy tarry matters are contained in the carbon bisulfid, besides small parts of the aqueous solution. These latter parts can be removed by allowing them to separate on the top of the carbon bisulfid in the closed tank M, from the bottom of which the carbon bisulfid runs through pipe-line $y$ $y$, if salts of nicotin are to be made, to vessel N, filled with solution of some kind of acid, with which it is mixed until all alkaloid has left the carbon bisulfid. In some cases it may be useful to give the carbon bisulfid two washings with acid solutions. Therefore two acid vessels are arranged one on top of the other to allow it to flow from one into the other.

If free from all alkaloids, the carbon bisulfid may be run off into the reservoir-tank O, to be used again. If a solution of alkaloid as pure as possible is intended, the carbon bisulfid may be conveyed through pipe $y$ to air-evaporating pan $A^2$, in which it is evaporated. The pan $A^2$ is provided with a surface condenser $B^2$, from which the carbon bisulfid may be conveyed into reservoir-tank O for further use. The nearly-pure alkaloid remains on the bottom of the pan.

I claim as my invention—

1. The herein-described method of obtaining from raw aqueous extract of tobacco, a condensed tobacco extract and a condensed solution of purified nicotin, said method consisting in freeing the nicotin in the raw aqueous extract, subjecting the extract to evaporation, condensing the separated vapors containing the nicotin, then extracting the nicotin from the thus-obtained distillate by subjecting it to the action of an extracting agent and finally separating the nicotin from the extracting agent, all substantially as described.

2. The herein-described method of obtaining from raw aqueous extract of tobacco, a condensed tobacco extract and a condensed solution of purified nicotin, said method consisting in freeing the nicotin in the raw aqueous extract, subjecting the extract to evaporation, condensing the separated vapors containing the nicotin, then extracting the nicotin from the thus-obtained distillate by subjecting it to the action of carbon bisulfid and finally separating the nicotin from the carbon bisulfid, all substantially as described.

3. The herein-described method of obtaining from raw aqueous extract of tobacco, a condensed tobacco extract and a condensed solution of purified nicotin, said method consisting in subjecting the raw aqueous extract to the action of an alkali to free the nicotin, evaporating the extract, condensing the nicotin carried over by the vapors, condensing the separated vapors containing the nicotin, then extracting the nicotin from the thus-obtained distillate, by subjecting it to the action of an extracting agent and finally separating the nicotin from the extracting agent, all substantially as described.

4. The herein-described method of obtaining from raw aqueous extract of tobacco a condensed tobacco extract and a condensed solution of purified nicotin, said method consisting in freeing the nicotin in the raw aqueous extract, subjecting the extract to evaporation, condensing the separated vapors containing the nicotin, then extracting the nicotin from the thus-obtained distillate by passing an extracting agent in finely-divided drops through the distillate and finally separating the nicotin from the extracting agent, substantially as described.

5. The herein-described method of obtaining from raw aqueous extract of tobacco a condensed tobacco extract and a condensed solution of purified nicotin, said method consisting in freeing the nicotin in the raw aqueous extract, subjecting the extract to evaporation, condensing the separated vapors containing the nicotin, then extracting the nicotin from the thus-obtained distillate by passing bisulfid of carbon in finely-divided drops through the distillate and finally separating the nicotin from the carbon bisulfid, substantially as described.

In testimony whereof I have signed my name to this specification in the presence of two subscribing witnesses.

CHRISTIAN FRIEDRICH GLOYSTEIN.

Witnesses:
GUS STARR,
ALVAN J. LOCKETT.